(12) United States Patent
Rai et al.

(10) Patent No.: US 8,204,517 B1
(45) Date of Patent: Jun. 19, 2012

(54) METHOD AND SYSTEM OF PAGING A MOBILE STATION

(75) Inventors: Deveshkumar N. Rai, Overland Park, KS (US); Manoj Shetty, Overland Park, KS (US); Sachin R. Vargantwar, Overland Park, KS (US); Siddharth S. Oroskar, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 649 days.

(21) Appl. No.: 12/369,553

(22) Filed: Feb. 11, 2009

(51) Int. Cl.
H04W 68/00 (2009.01)

(52) U.S. Cl. .................. 455/458; 455/422.1; 455/426.1

(58) Field of Classification Search .................. 455/458, 455/422.1, 443–452.1, 404.2, 456.1, 457, 455/426.1, 418–420, 513, 515, 509, 516, 455/525, 560, 561, 562.1, 179.1; 370/310.2, 370/328, 329, 338, 341, 443
See application file for complete search history.

(56) References Cited

U.S. PATENT DOCUMENTS

| | | | |
|---|---|---|---|
| 5,590,398 A | 12/1996 | Matthews | |
| 6,745,039 B1 | 6/2004 | Di Lalla | |
| 2004/0254980 A1* | 12/2004 | Motegi et al. | 709/203 |
| 2007/0077948 A1 | 4/2007 | Sharma et al. | |
| 2007/0249329 A1 | 10/2007 | Zou | |
| 2008/0207227 A1* | 8/2008 | Ren et al. | 455/458 |
| 2009/0082041 A1* | 3/2009 | Ranganathan et al. | 455/458 |

FOREIGN PATENT DOCUMENTS
WO 2006079210 A1 8/2006

OTHER PUBLICATIONS

Dr. Jey Veerasamy et al. "Practical Approach to Optimize Paging Success Rate in CDMA Network", IEEE Communication Society, 2005.*
G.L. Lyberopoulos et al., "Intelligent Paging Strategies for Third Generation Mobile Telecommunication Systems," published in IEEE Transactions on Vehicular Technology, vol. 44, Issue 3, 543-554 (Aug. 1995).
Masakazu Shirota et al., "Performance Evaluation of a Paging Sequence Updating Scheme," Abstract, Electronics and Communications in Japan (Part I: Communications), vol. 81, Issue 6, pp. 61-60 (Dec. 7, 1998).
M. Shirota, et al., "Statistical Paging Area Selection Scheme (SPAS) for cellular mobile communication systems," Abstract, Vehicular Technology Conference, 1994 IEEE 44th, vol. 1, Issue, 8-10 pp. 367-370 (1994).

(Continued)

*Primary Examiner* — Kent Chang
*Assistant Examiner* — San Htun

(57) ABSTRACT

An access network may identify paging areas based on a reference location (e.g., a mobile station's last known location), where each paging area includes at least one coverage area. The access network may then determine paging-channel occupancies for coverage areas in at least identified paging area. In turn, the access network may adjust a given identified paging area based on the determined paging-channel occupancies, resulting in an adjusted paging area. For example, the access network may add coverage areas to the given identified paging area and/or remove coverage areas from the given identified paging area based on the paging-channel occupancies for those coverage areas. Thereafter, the access network may page a mobile station associated with the reference location in the adjusted paging area.

20 Claims, 11 Drawing Sheets

OTHER PUBLICATIONS

Vijay Raman et al., "Performance Analysis of the Distance-Based Location Update Mechanism of CDMA 1X EV-DO," IEEE Global Telecommunications Conference (Globocom), vol. 5 Issue 28, pp. 2875-2880 (Nov. 28-Dec. 2, 2005).

Ben Liang et al., "Predictive Distance-Based Mobility Management for PCS Networks," INFOCOM '99. Eighteenth Annual Joint Conference of the IEEE Computer and Communications Societies, vol. 3, pp. 1377-1384 (Mar. 1999).

* cited by examiner

METHOD AND SYSTEM OF PAGING A MOBILE STATION

BACKGROUND

The art and popularity of wireless communications has grown significantly over recent years. Indeed, millions of people are engaging in voice and data communications using mobile stations such as cellular telephones and Personal Digital Assistants (PDAs).

In a typical cellular wireless network, an area is divided geographically into a number of coverage areas, such as cells and sectors, each defined by a radio frequency (RF) radiation pattern from a respective base transceiver station (BTS). Within each coverage area, the BTS's RF radiation pattern provides an air interface over which mobile stations may communicate with the cellular wireless network. In turn, the cellular wireless network may communicate with one or more other networks, such as the Public Switched Telephone Network (PSTN) or the Internet. As such, when a mobile station is positioned within a coverage area of the cellular wireless network, the mobile station can communicate with entities on the other networks via the cellular wireless network.

The RF air interface of any given coverage area in the cellular wireless network is typically divided into a plurality of channels for carrying communications between mobile stations and the cellular wireless network. For example, the RF air interface may include a plurality of forward-link channels, such as pilot channels, sync channels, paging channels, control channels, and forward-traffic channels, for carrying communications from the cellular wireless network to the mobile stations. As another example, the RF air interface may include a plurality of reverse-link channels, such as access channels and reverse-traffic channels, for carrying communications from the mobile stations to the cellular wireless network. However, the number of channels on a given air interface, and thus the number of simultaneous communications the given air interface can support, is limited by hardware and/or protocol constraints. As such, cellular wireless networks often try to conserve the limited supply of air-interface channels.

One common way a cellular wireless network conserves air-interface channels is by employing a paging process to locate idle mobile stations before assigning a traffic channel to those mobile stations. In this respect, when a given mobile station is idle, the cellular wireless network may only track the location of the mobile station at a coarse granularity (if at all), thus reducing the number of messages exchanged between the cellular wireless network and the idle mobile station. When the cellular wireless network receives a request to set up a communication with the given mobile station, the cellular wireless network may then page the given mobile station in a plurality of coverage areas, which may be selected based on a reference location such as a last-known location of the given mobile station. If the given mobile station is located in a given one of those coverage areas, the given mobile station may respond to the cellular network, and more particularly the BTS serving the given coverage area. Accordingly, the cellular wireless network may be able to locate the given mobile station without tying up traffic channels in various coverage areas or maintaining constant communication with the given mobile station.

Although the paging process described above may enable the cellular wireless network to conserve its limited supply of air-interface channels while locating mobile stations, the paging process may have a negative impact on call setup time. As such, an improved paging process is desired.

Overview

Disclosed herein is a method of paging a mobile station in an access network that serves mobile stations located in a plurality of coverage areas. Preferably, the method will be carried out in response to receiving a request to set up a communication with the mobile station. Unless clearly indicated by the context, different examples described herein can be used together. Further, unless clearly indicate by the context, method steps may be carried out in an order other than that in which they are recited.

In one aspect, the method may include (a) identifying two or more paging areas based on a reference location, where each paging area comprises at least one coverage area and each coverage area has a paging channel arranged to carry paging messages (e.g., IS-856 forward control channels, 1xRTT forward paging channels, etc.), (b) determining paging-channel occupancies for coverage areas in at least one of the identified two or more paging areas, (c) adjusting a given identified paging area based on the determined paging-channel occupancies, resulting in an adjusted paging area, and (d) paging a mobile station associated with the reference location in the adjusted paging area.

In another aspect, the exemplary method may include (a) identifying two or more paging areas based on a reference location, where each paging area comprises at least one coverage area and each coverage area has a paging channel arranged to carry paging messages, (b) determining a representative first-page success rate for a given identified paging area (e.g., a number of mobile stations located with a first page in the given identified paging area divided by a number of first pages sent in the given identified paging area, or perhaps an average of first-page success rates of coverage areas in the given identified paging area, and so on), (c) if the representative first-page success rate for the given identified paging area is greater than or equal to a given threshold, then paging a mobile station associated with the reference location in the given identified paging area, and (e) if the representative first-page success rate for the given identified paging area is less than the given threshold, then (1) determining paging-channel occupancies for coverage areas in at least one of the identified two or more paging areas, (2) adjusting the given identified paging area based on the determined paging-channel occupancies, resulting in an adjusted paging area, and (3) paging a mobile station associated with the reference location in the adjusted paging area.

The reference location may take various forms. In one example, the reference location may be a last-known location of the mobile station being paged. In this respect, the last-known location of the mobile station may be a location of a last-known base transceiver station (BTS) with which the mobile station communicated.

The given identified paging area may also take various forms. In one example, the given identified paging area may be a first paging area in which to send a first page to the mobile station. In another example, the given identified paging area may be a second paging area in which to send a second page to the mobile station. In this respect, the first page to the mobile station may have been unsuccessful.

There may be various techniques for adjusting the given identified paging area based on the determined paging-channel occupancies. For example, adjusting the given identified paging area based on the determined paging-channel occupancies may include adding to the given identified paging area any coverage area in an identified paging area other than the given identified paging area with a paging-channel occupancy below a first threshold. As another example, adjusting the given identified paging area based on the determined paging-channel occupancies may include removing from the given identified paging area any coverage area in the given identified paging area with a paging-channel occupancy above a second threshold.

As still another example, adjusting the given identified paging area based on the determined paging-channel occupancies may include (1) determining a representative paging-channel occupancy for the given identified paging area, (2) if the representative paging-channel occupancy for the given identified paging area is below a first threshold, increasing a size of the given identified paging area until (i) the representative paging-channel occupancy for the now-increased given identified paging area is above the first threshold or (ii) the size of the now-increased given identified paging area reaches a predefined maximum, and (3) if the representative paging-channel occupancy for the given identified paging area is above a second threshold, decreasing a size of the given identified paging area until (i) the representative paging-channel occupancy for the now-decreased given identified paging area is below the second threshold or (ii) the size of the now-decreased given identified paging area reaches a predefined minimum. In this respect, the representative paging-channel occupancy for the given identified paging area may be an average of the determined paging-channel occupancies for coverage areas in the given identified paging area.

In one embodiment, the method may further include (a) storing data defining the adjusted paging area and (b) using the data defining the adjusted paging area when next identifying two or more paging areas for the reference location.

Also disclosed herein is a radio network controller (RNC) that includes (a) a communication interface coupled to a plurality of base transceiver stations (BTSs), where each BTS serves mobile stations in a respective coverage area and the RNC communicates with mobile stations via the communication interface and the BTSs, (b) a processor, (c) data storage, and (d) program instructions stored in the data storage and executable by the processor for carrying out one or more of the methods described above.

These as well as other aspects and advantages will become apparent to those of ordinary skill in the art by reading the following detailed description, with reference where appropriate to the accompanying drawings.

DETAILED DESCRIPTION

Figure 1:
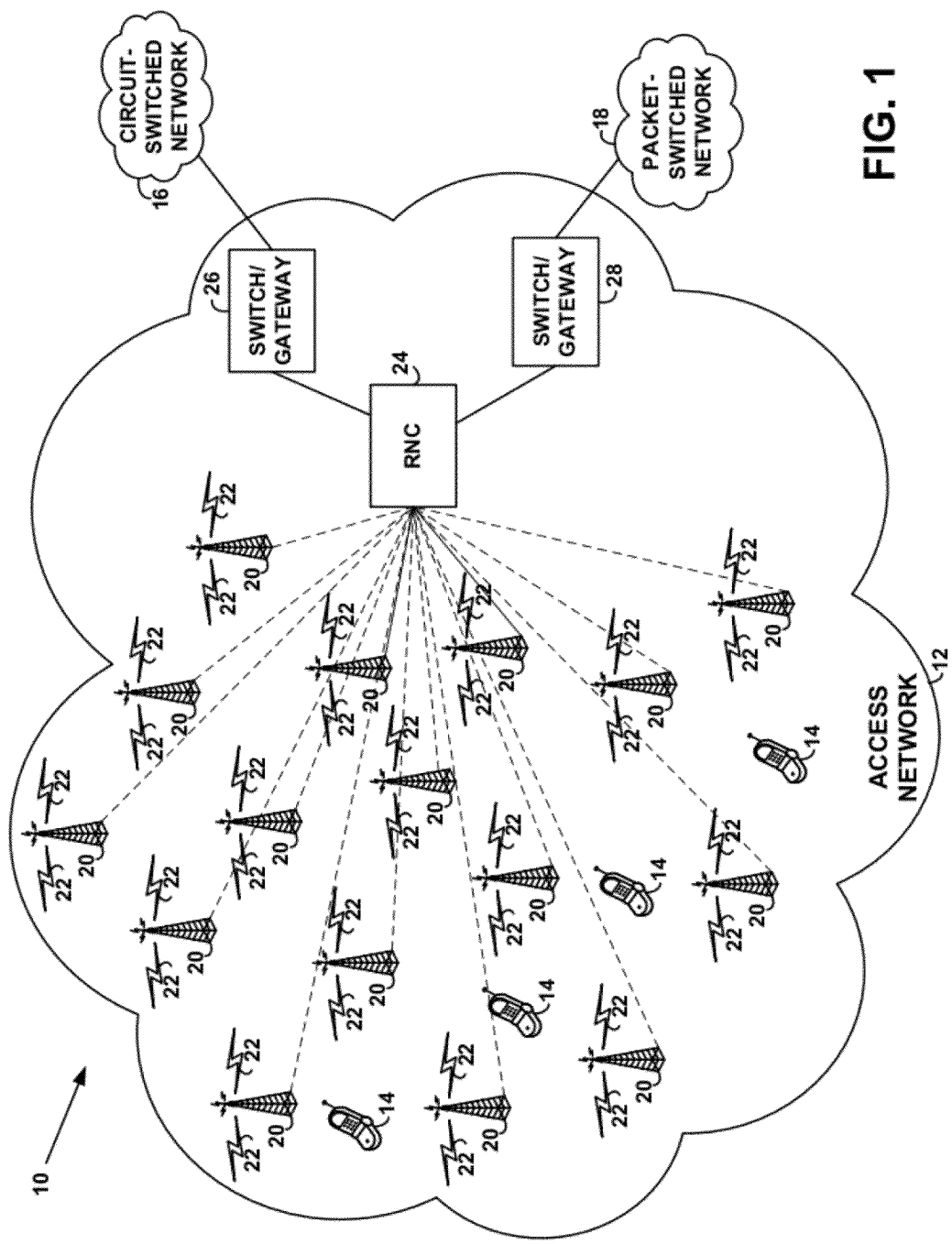
FIG. 1 is a simplified block diagram of a telecommunications system in which embodiments of the invention can be implemented.

Referring to the drawings, FIG. 1 is a simplified block diagram of a telecommunications system 10 in which embodiments can be implemented. As shown, the system 10 includes an access network 12, which may function to provide connectivity between one or more mobile stations 14 (e.g., cell phones, PDAs, and/or other wirelessly-equipped devices) and one or more transport networks, such as a circuit-switched network 16 (e.g., the public switched telephone network (PSTN)) or a packet-switched network 18 (e.g., the Internet).

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine-language instructions stored in memory.

As shown, the access network 12 may include a plurality of base transceiver stations (BTSs) 20 located throughout a geographical area. Each BTS 20 may transmit RF-radiation patterns that provide one or more air interfaces 22 through which the mobile stations 14 may communicate with the access network 12. For example, each BTS 20 may transmit omnidirectional RF-radiation patterns that provide a single air interface 22. Alternatively, each BTS 20 may transmit directional RF-radiation patterns that provide multiple air interfaces 22.

Each of the one or more air interfaces 22 of a given BTS 20 may define a corresponding wireless coverage area of the given BTS 20. For example, if the given BTS 20 radiates to provide a single air interface 22, then the given BTS 20 may serve a single wireless coverage area (e.g., a cell). Alternatively, if the given BTS 20 radiates to provide multiple air interfaces 22, the given BTS 20 may serve multiple wireless coverage areas (e.g., sectors). In either case, each of the one or more air interfaces 22 and corresponding wireless coverage areas may be identified by an identifier of the given BTS, one or more carrier frequencies of the given BTS, and/or a pseudo-random number (PN) offset that distinguishes one wireless coverage area of the given BTS 20 from another. The coverage areas of the BTSs 20 may collectively define the coverage area of the access network 12.

The air interfaces 22 may carry communications according to any of a variety of protocols. For example, the air interfaces 22 may carry communications according to CDMA (e.g., 1xRTT, IS-856), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces 22 may also be divided into a plurality of channels. For example, in an IS-856 protocol (also known as Evolution-Data Optimized (EV-DO)), each air interface 22 may include a forward pilot channel, a forward Medium Access Control (MAC) channel, a forward control channel, a plurality of forward traffic channels, a reverse access channel, and a plurality of reverse traffic channels. As another example, in a 1xRTT protocol, each air interface 22 may include a forward pilot channel, a forward sync channel, a forward paging channel, a plurality of forward traffic channels, a reverse access channel, and a plurality of reverse traffic channels. Other examples of air-interface channel structures may be used as well.

Each BTS 20 of the access network 12 may then couple to an entity often referred to as a radio network controller (RNC) 24 or base station controller (BSC), which may function to communicate with each BTS 20 and control aspects of the BTSs 20 as well as aspects of the air-interface communication with the mobile stations 14. (Although FIG. 1 depicts the access network 12 as including a single RNC 24 that couples to all BTSs 20, it should be understood that the access network 12 may include a plurality of RNCs 24 coupled together, in which case each RNC 24 may couple to a subset of the BTSs 20). As one example, the RNC 24 may control paging of and assignment of air-interface traffic channels to mobile stations 14. As another example, the RNC 24 may control aspects of a given mobile station 14 switching between coverage areas of the access network 12. As yet another example, the RNC 24 may facilitate communications between BTSs 20. Many other examples are possible as well.

The RNC 24 may then couple to a switch/gateway 26, such as a mobile switching center (MSC), which may provide connectivity with the circuit-switched network 16. Further, the RNC 24 may couple to a switch/gateway 28, such as a packet data serving node (PDSN), which may provide connectivity with the packet-switched network 18. In this respect, the RNC 24 may additionally include a packet control function ("PCF") for controlling packet-data communications. Accordingly, with this general arrangement, the access network 12 may facilitate communications between two mobile stations 14 operating in the access network's market area, as well as communications between (a) one or more mobile stations 14 operating in one of the access network's coverage areas and (b) the circuit-switched network 16 and/or the packet-switched network 18.

As described above, the access network 12 will preferably employ a paging method to locate a mobile station 14 before assigning a forward traffic channel to the mobile station 14. In particular, when the access network 12 receives a request to set up a communication with a mobile station 14 (e.g., from another mobile station 14 on the access network 12, the circuit-switched network 16, or the packet-switched network 18), the access network 12 may page the given mobile station 14 in one or more coverage areas, such as by having the one or more BTSs 20 serving the one or more coverage areas send a page message addressed to the mobile station 14. In this respect, each BTS 20 typically sends page messages over a particular air-interface channel arranged to carry paging messages (i.e., a "paging channel"), such as an IS-856 forward control channel or a 1xRTT forward paging channel. (It should be understood that the channels arranged to carry paging messages may also carry other messages, such as system-parameter messages and/or access-parameter messages.) If the mobile station 14 receives a page message while located in one of the paged coverage areas, the mobile station 14 may then send a page response back to the BTS 20 serving that coverage area. In turn, that BTS 20 may work together with the RNC 24 to determine the coverage area in which the mobile station 14 is located and then assign a traffic channel to the mobile station 14 in that coverage area.

Various implementations of the paging method described above currently exist. In one implementation, known as "system-wide paging," the access network 12 may page the given mobile station 14 in all coverage areas in the first instance. In this respect, the system-wide paging method may maximize the success rate of the first page, which may in turn reduce call-setup time. In doing so, however, the system-wide paging method may significantly increase the occupancy of all paging channels, which may in turn significantly delay page messages and/or other messages (e.g., system-parameter messages, access-parameters messages, etc.) sent over the paging channels. In some cases, this delay may be so significant that the paging channels become unusable.

To avoid the significant increase in occupancy of paging channels, other paging method implementations may enable the access network 12 to page the mobile station 14 in a particular subset of coverage areas, as opposed to all coverage areas. For example, in an implementation known as "zone-based paging," the access network's coverage areas (and serving BTSs 20) may be grouped into one or more paging areas, or "zones," using predefined criteria. An access network 12 employing zone-based paging may then select one or more predefined zones in which to page a mobile station 14, preferably based on a last known location of the mobile station 14. In particular, when an access network 12 employing zone-based paging receives a request to set up a communication with a mobile station 14, the access network 12 may first determine a last-known zone in which the given mobile station 14 was located, preferably based on a last location update received from the mobile station 14.

In this respect, an idle mobile station 14 will preferably send a location update each time it enters a new zone. After determining the mobile station's last-known zone, the access network 12 may direct BTSs 20 located in the last-known zone to send a first page for receipt by the mobile station 14. If this first page is unsuccessful, the access network 12 may then direct the BTSs 20 located in the last-known zone and BTSs 20 located in one or more additional zones (e.g., zones adjacent to the last-known zone) to send a second page to the mobile station 14. The access network 12 may then continue this process until it locates the mobile station 14, pages the mobile station 14 in all coverage areas, and/or reaches a time or attempt limit.

In another implementation known as "distance-based paging," the access network's coverage areas may be grouped into paging areas that the access network 12 defines based on a location of the last-known BTS 20 with which the mobile station 12 communicated. The access network 12 may then page the mobile station 14 in one or more of these paging areas. In particular, when an access network 12 employing distance-based paging receives a request to set up a communication with a mobile station 14, the access network 12 may first determine a location of the last-known BTS 20 with which the mobile station 12 communicated, preferably based on a last location update received from the mobile station 14.

In this respect, an idle mobile station 14 will preferably send a location update (e.g., an IS-856 Route Update Message) each time it begins communicating with a new BTS 20 that is located more than a predefined distance from the BTS 20 identified in the mobile station's last location update. After determining the last-known BTS's location, the access network 12 may direct BTSs 20 located in a first paging area, which is defined by a first radius (e.g., 3 miles) from the last-known BTS's location, to send a first page for receipt by the mobile station 14. If this first page is unsuccessful, the access network 12 may then direct the BTSs 20 located in a second paging area, which is defined by a larger second radius (e.g., 7 miles) from the last-known BTS's location, to send a second page to the mobile station 14. The access network 12 may then continue this process until it locates the mobile station 14, pages the mobile station 14 in all coverage areas, and/or reaches a time or page-message limit.

Paging method implementations that allow the access network 12 to page the mobile station 14 in less than all coverage areas, such as zone-based paging and distance-based paging, may significantly reduce the occupancy of paging channels, thus allowing the access network 12 to send messages over those channels without appreciable delay. In doing so, however, these paging method implementations may decrease the success rate of the first page (i.e., the number of successful first pages divided by the number of sent first pages), which may in turn increase call-setup time. In some cases, this decease in first-page success rate may be avoidable, especially when the occupancies of paging channels outside the first paging area are below a lower limit of an acceptable range for paging-channel occupancy.

Described herein is an exemplary paging method that may enable the access network 12 to balance the first-page success rate (and call-setup time) with the occupancy of paging channels. According to an embodiment, the access network 12 may first identify two or more paging areas based on a reference location, with each paging area including at least one coverage area of the access network 12. In one example, the reference location may be a last-known location of a mobile station that the access network 12 is preparing to page, such as a location of a last-known BTS 20 with which the mobile station communicated. The access network 12 may identify the paging areas using any method now known or later developed, including zone-based paging, distance-based paging, another method, and/or some variation and/or combination thereof.

After identifying the paging areas, the access network 12 may determine paging-channel occupancies for coverage areas in at least one of the identified paging areas. The access network 12 may then adjust a given identified paging area based on the determined paging-channel occupancies for the coverage areas in the at least one identified paging area, resulting in an adjusted paging area. For example, the access network 12 may add one or more coverage areas to the given identified paging area based on the determined paging-channel occupancies for those coverage areas. As another example, the access network 12 may remove one or more coverage areas from the given identified coverage area based on the determined paging-channel occupancies for those coverage areas. The techniques for making these adjustments to the given identified paging area are described in more detail below. After adjusting the given identified paging area, the access network 12 may then page a mobile station associated with the reference location (e.g., a mobile station having the reference location as its last-known location) in the adjusted paging area.

Advantageously, the methods described herein may enable the access network 12 to dynamically adjust a paging area based on current network conditions. For example, the access network 12 may be able to expand a paging area to add coverage areas with low paging-channel occupancies, thus improving first-page success rate without significantly degrading network performance. As another example, the access network 12 may be able to contract a paging area to remove coverage areas with high paging-channel occupancies, thus avoiding a significant degradation in network performance. Other benefits may exist as well.

Figure 2:
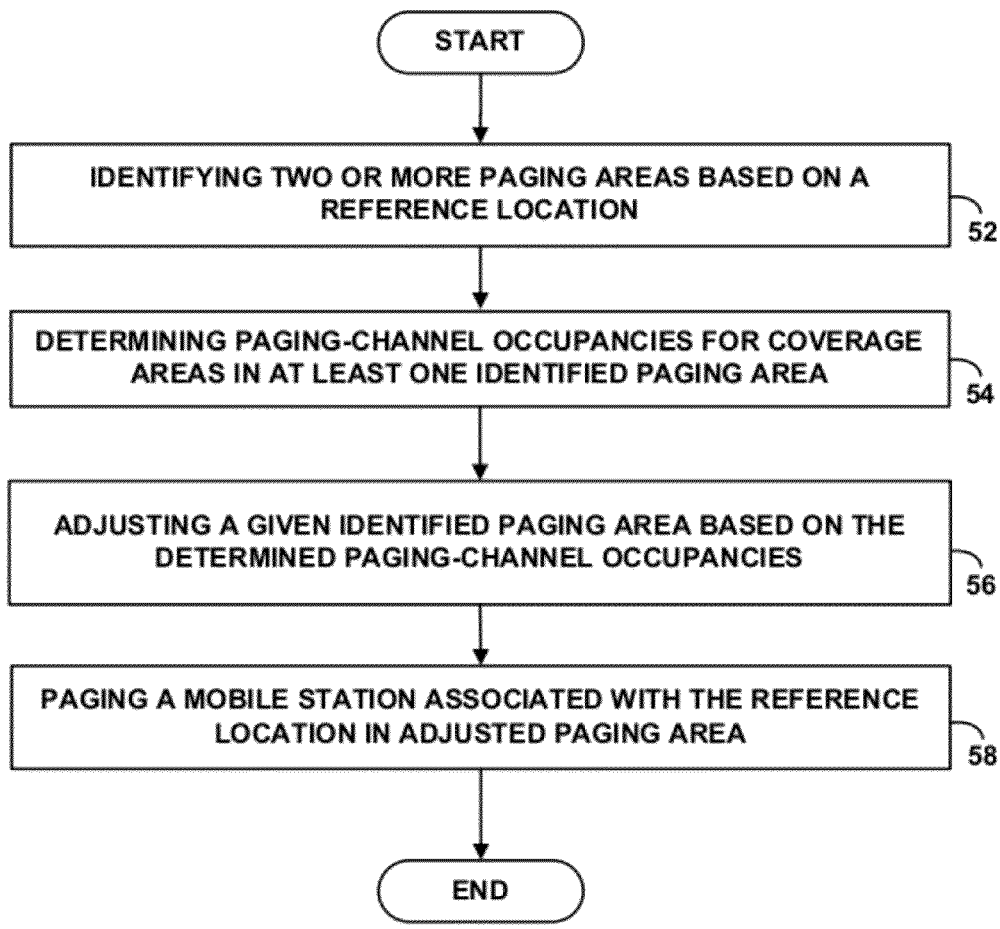
FIG. 2 is a flow chart depicting a method of paging a mobile station.

FIG. 2 is a flow chart depicting a method of paging a mobile station 14. In one example, the method described herein will be carried out by the access network 12, and in particular the RNC 24 working together with the BTSs 20. This method may be carried out in response to the RNC 24 receiving a request to set up a communication with the mobile station 14. The requested communication may be any type of communication, including a phone call, a packet-data session, and/or a short message service (SMS) message, as examples. Further, the RNC 24 may receive the request from one of various system entities. For example, the RNC 24 may receive the request from the packet-switched network 18 via the switch/gateway 28. As another example, the RNC 24 may receive the request from the circuit-switched network 16 via the switch/gateway 26. Other examples are possible as well.

At step 52, the RNC 24 may identify two or more paging areas based on a reference location, where each paging area includes at least one coverage area. As described above, the RNC 24 may identify the two or more paging areas for the mobile station 14 using any method now known or later developed, including zone-based paging or distance-based paging, as examples.

The reference location may take various forms. In one embodiment, the reference location may be a last-known location of a mobile station 14 being paged. In this respect, the mobile station's last-known location may be a location of the last-known BTS 20 with which the mobile station 14 communicated (indicated here as BTS $20_{LK}$), such as a latitude/longitude of the last-known BTS $20_{LK}$. The last-known BTS $20_{LK}$ may be a BTS 20 identified in a last location update (e.g., an IS-856 Route Update Message) received from the mobile station 14. Alternatively, the mobile station's last-known location may be a last-known geographic location of the mobile station 14, such as a last-known GPS-based location of the mobile station 14. Alternatively yet, the mobile station's last-known location may be some other location within a last-known coverage area in which the mobile station 14 was located, such as a latitude/longitude of the last-known coverage area's centroid. Other examples of mobile station locations may exist as well, including the possibility that the mobile station's last-known location is a combination of the above options. In another embodiment, the reference location may be a location other than a mobile station's last-known location, such as a location of a particular BTS 20.

The RNC 24 may identify the reference location in various manners. For example, if the reference location is a last-known location of a mobile station 14 being paged, the RNC 24 may determine the mobile station's last-known location by using an identifier of the mobile station 14 to access data indicating the mobile station's last-known location. To facilitate this, the RNC 24 may maintain or have access to a location database that stores data indicating a last-known location of each idle mobile station 14 in the system 10, and the RNC 24 (or some other entity) may update this location database when it receives location updates from mobile stations 14. Other examples for identifying the reference location may be used as well.

After identifying the reference location, the RNC 24 may then identify the paging areas based on the reference location. In one example, the RNC 24 may identify the paging areas by using the reference location and one or more other parameters (e.g., predefined radii) to dynamically define each paging area. In another example, the RNC 24 may identify the paging areas by using the reference location to access pre-stored data defining paging areas for that reference location (i.e., predefined paging areas), in which case the RNC 24 may maintain or have access to a paging-areas database that stores data defining the predefined paging areas for each possible reference location. For implementations in which the reference location is a location of a BTS 20, the data defining the predefined paging areas may thus be correlated with BTS locations. Other examples for identifying the paging areas based on the reference location may be used as well.

Figure 3:
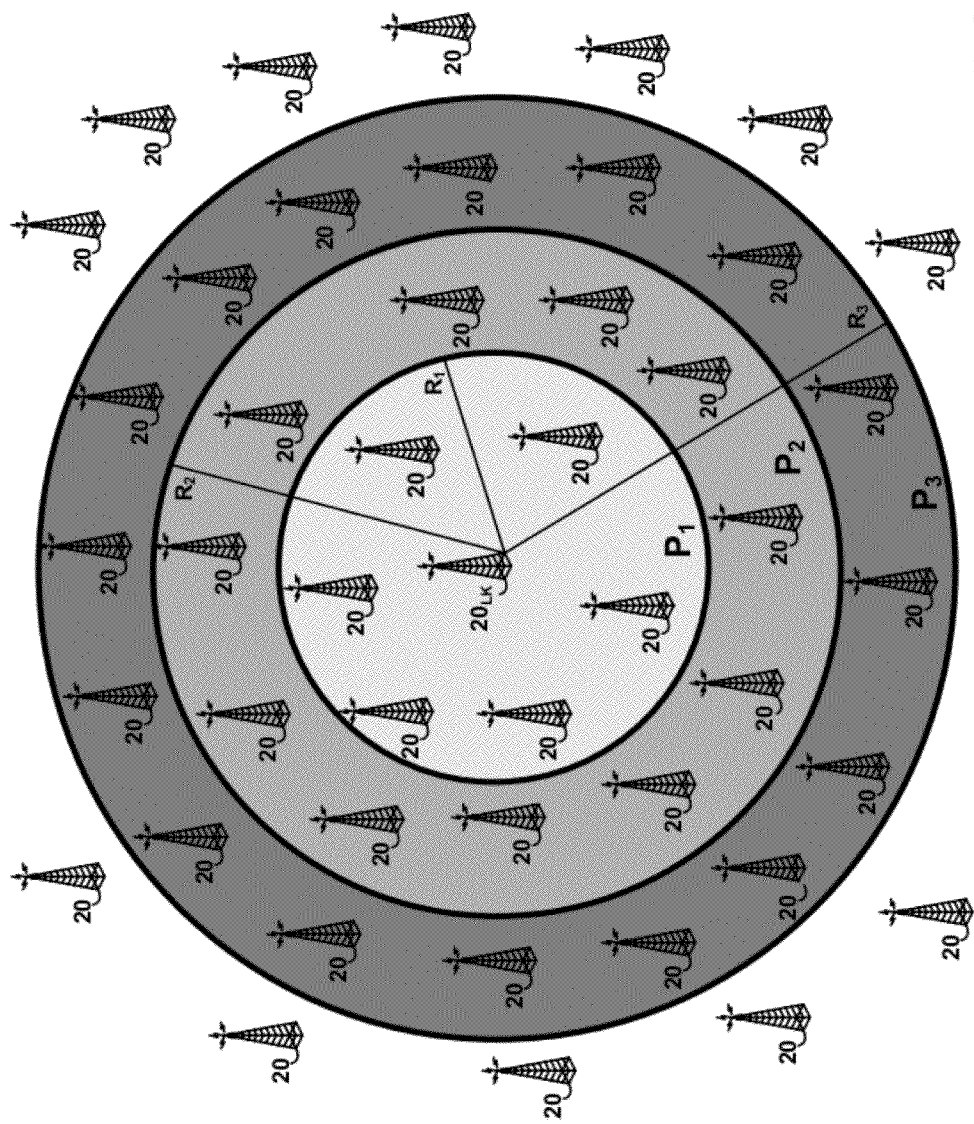
FIG. 3 depicts exemplary paging areas for a mobile station.

The identified paging areas themselves may take a variety of forms, depending on the techniques used to define the paging areas. In one example, the identified paging areas may be those defined by a distance-based paging method. In this respect, as shown in FIG. 3, the paging areas for the mobile station 14 may take the form of (a) a circular first paging area $P_1$ defined by a first radius $R_1$ from the last-known BTS's location, (b) a circular second paging area $P_2$ defined by a larger second radius $R_2$ from the last-known BTS's location, and (c) a circular third paging area $P_3$ defined by an even larger third radius $R_3$ from the last-known BTS's location. The first, second, and third radii that define these paging areas may be based on a distance parameter that corresponds to the last known $BTS_{LK}$ (e.g., an IS-856 RouteUpdateRadius parameter), which the RNC 24 may have received from the mobile station 14 in a location update message (e.g., an IS-856 Route Update Message). For example, the first radius $R_1$ may be approximately ⅓ of the distance parameter, the second radius $R_2$ may be approximately ⅔ of the distance parameter, and the third radius $R_3$ may be the distance parameter itself. Many other examples of paging areas exist as well, including those described in U.S. patent Application No. 12/173,681, assigned to Sprint Spectrum L.P.

While identifying the paging areas based on the reference location, the RNC 24 may also identify the BTSs 20 (and corresponding coverage areas) located in each of the identified paging areas. In one aspect, the RNC 24 may identify the BTSs 20 located in the identified paging areas by using the reference location to access pre-stored data indicating which BTSs 20 are located in the identified paging areas. In this respect, the RNC 24 may maintain or have access to a database, such as the paging-areas database described above, that stores data indicating the BTSs 20 located in each predefined paging area.

In another aspect, the RNC 24 may identify the BTSs 20 located in the identified paging areas by comparing data defining the identified paging areas to data indicating locations of the BTSs 20, in which case the RNC 24 may additionally maintain or have access to data indicating the locations of the BTSs 20. For example, referring to the paging areas depicted in FIG. 3, the RNC 24 may identify the BTSs 20 by comparing a distance D between a given BTS's location and the last-known BTS's location to the first, second, and third radii that define the paging areas. In this respect, (a) if $D \leq R_1$, the given BTS is in all three paging areas, (b) if $R_1 < D \leq R_2$, the given BTS is in the second paging area $R_2$ and third paging area $P_3$, (c) if $R_2 < D \leq R_3$, the given BTS 20 is in the third paging area $P_3$ only, and (d) if $D > R_3$, the given BTS 20 is not within the paging areas for the mobile station 14. Many other examples are possible as well.

At step 54, the RNC 24 may determine paging-channel occupancies for coverage areas in at least one of the identified paging areas. Depending on the method used to adjust the given identified paging area, the RNC 24 may determine paging-channel occupancies for coverage areas in all identified paging areas, or a subset thereof (e.g., coverage areas in any identified paging area other than the given identified paging area).

In one example, the RNC 24 will determine the paging-channel occupancies of the coverage areas of interest by using identifiers of those coverage areas to access data indicating the paging-channel occupancies of those coverage areas. To facilitate this, the RNC 24 will preferably maintain or have access to a paging-channel database that stores data indicating paging-channel occupancy of each coverage area of the access network 12, and the RNC 24 (or some other entity) may update this paging-channel database each time a coverage area's paging-channel occupancy changes. Other methods for determining paging-channel occupancies for coverage areas may be used as well.

At step 56, the RNC 24 may adjust a given identified paging area based on the determined paging-channel occupancies, resulting in an adjusted paging area. In this respect, the given identified paging area may be a first paging area in which to send a first page to the mobile station 14, a second paging area in which to send a second page to the mobile station, or some other paging area. The RNC 24 may use various methods for adjusting the given identified paging area based on the determined paging-channel occupancies.

Figure 4:
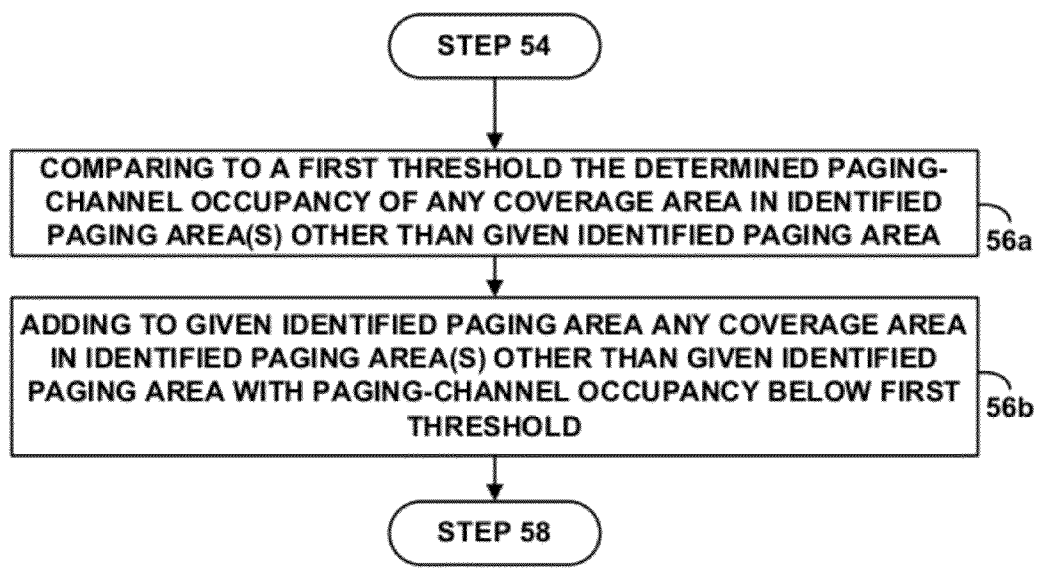
FIG. 4 is a flow chart depicting a first method of adjusting a given identified paging area based on determined paging-channel occupancies.

FIG. 4 is a flow chart depicting a first method of adjusting the given identified paging area based on the determined paging-channel occupancies. At step 56a, the RNC 24 may compare to a first threshold the determined paging-channel occupancy of any coverage area in an identified paging area other than the given identified paging area. (In this respect, at step 54, the RNC 24 may only determine the paging-channel occupancies of coverage areas in identified paging area(s) other than the given identified paging area.) The first threshold may represent a lower limit of an acceptable paging-channel occupancy range, such that a coverage area having a paging-channel occupancy below that threshold can experience an increase in paging-channel occupancy without significantly degrading network performance. In turn, at step 56b, the RNC 24 may add to the given identified paging area any coverage area in an identified paging area other than the given identified paging area with a paging-channel occupancy below the first threshold, resulting in an adjusted paging area that may include one or more additional coverage areas that were not part of the original paging area.

Figure 5:
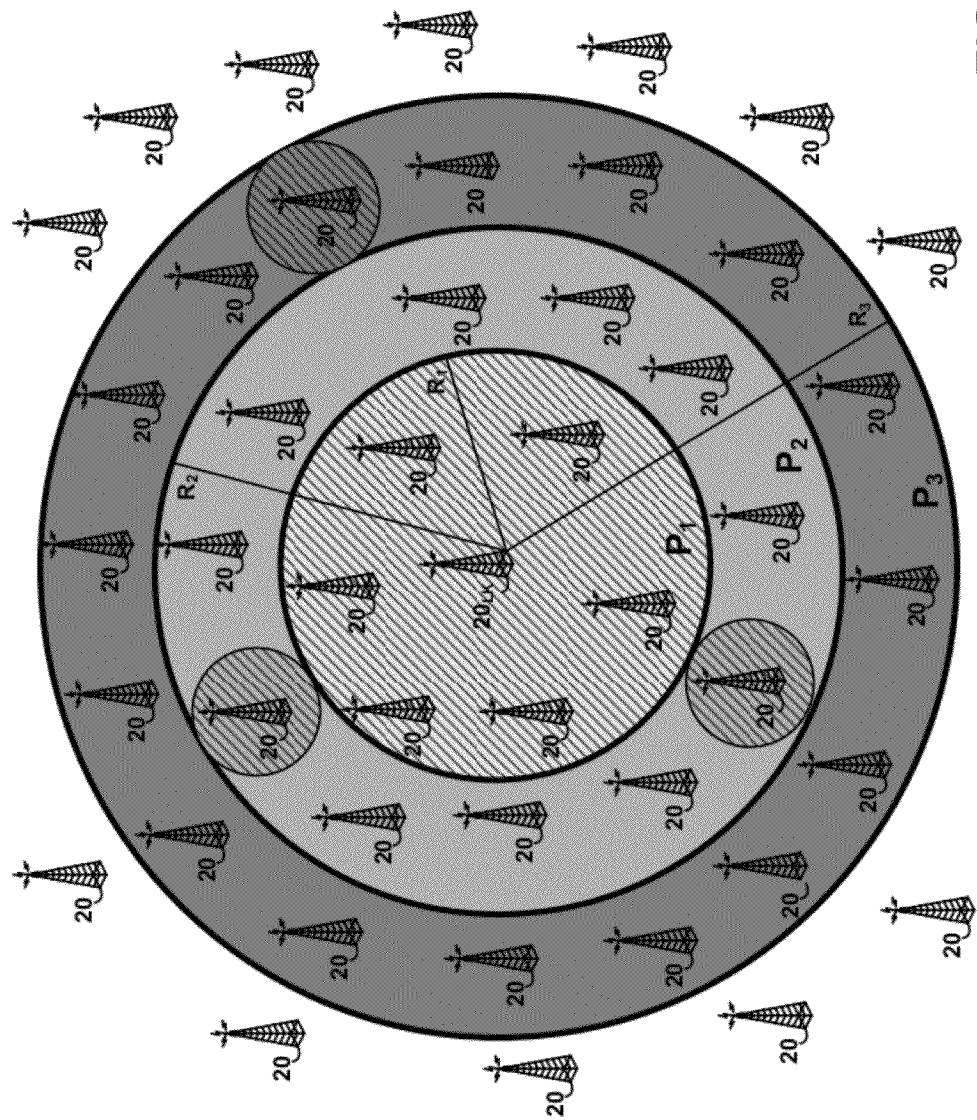
FIG. 5 depicts an adjusted paging area that may result from the method of FIG. 4.

FIG. 5 depicts an adjusted paging area that may result from carrying out the method of FIG. 4. As shown, similar to FIG. 3, the originally-identified paging areas for the mobile station 14, which are depicted with gray shading, may take the form of (a) a first circular paging area $P_1$ defined by a first radius $R_1$ from the last-known BTS's location, (b) a second circular paging area $P_2$ defined by a larger second radius $R_2$ from the last-known BTS's location, and (c) a third circular paging area $P_3$ defined by an even larger third radius $R_3$ from the last-known BTS's location. Each of these paging areas may encompass a plurality of BTSs 20, and thus a plurality of coverage areas. (For purposes of illustration, FIG. 5 assumes that each BTS 20 serves a single coverage area. As described above, however, each BTS 20 may serve multiple coverage areas.)

According to the first method of FIG. 4, the RNC 24 may then adjust the given identified paging area $P_1$ by adding to that paging area any coverage area in the second or third paging areas, but not the given identified paging area, that has a paging-channel occupancy below the first threshold. Thus, as shown in FIG. 5, the adjusted paging area, which is depicted with a diagonal pattern, may include the first circular paging area $P_1$ as well as certain additional coverage areas outside the given identified paging area. Of course, the coverage areas depicted in FIG. 5 as being added to the adjusted paging area are merely exemplary in nature, and it should be understood that any coverage area outside the original paging area may be included in the adjusted paging area as long as it has a paging-channel occupancy below the first threshold.

Figure 6:
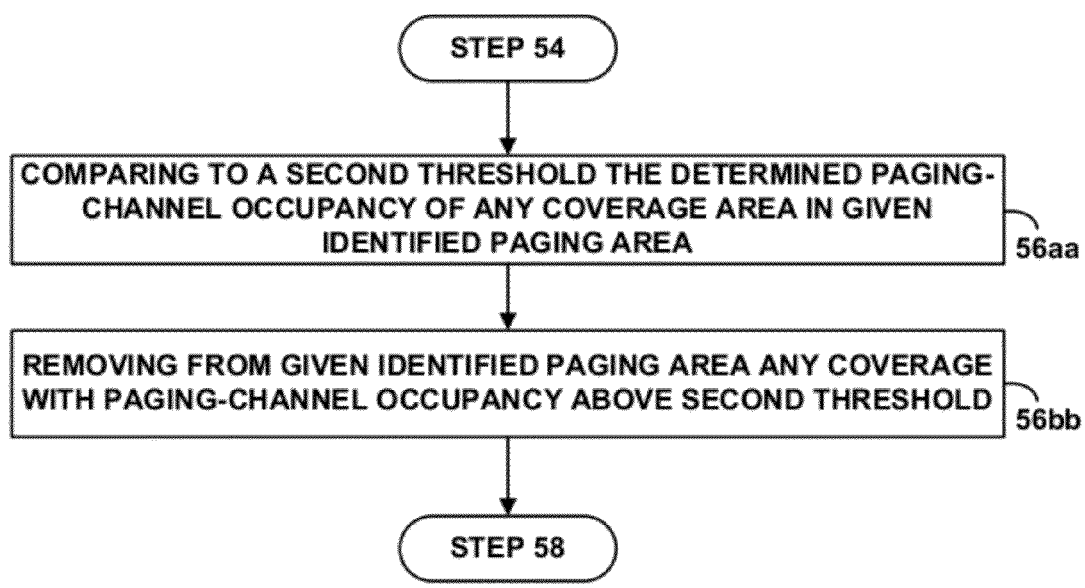
FIG. 6 is a flow chart depicting a second method of adjusting a given identified paging area based on determined paging-channel occupancies.

FIG. 6 is a flow chart depicting a second method of adjusting the given identified paging area based on the determined paging-channel occupancies. At step 56aa, the RNC 24 may compare to a second threshold the determined paging-channel occupancy of any coverage area in the given identified paging area. (In this respect, at step 54, the RNC 24 may only determine the paging-channel occupancies of coverage areas in the given identified paging area.) Preferably, the second threshold will represent an upper limit of an acceptable paging-channel occupancy range, such that any coverage area having a paging-channel occupancy above that threshold should experience a decrease paging-channel occupancy to avoid significantly degrading network performance. In turn, at step 56bb, the RNC 24 may remove from the given identified paging area any coverage area in the given identified paging area with a paging-channel occupancy above the second threshold, resulting in an adjusted paging area that may no longer include one or more coverage areas that were previously part of the original paging area.

Figure 7:
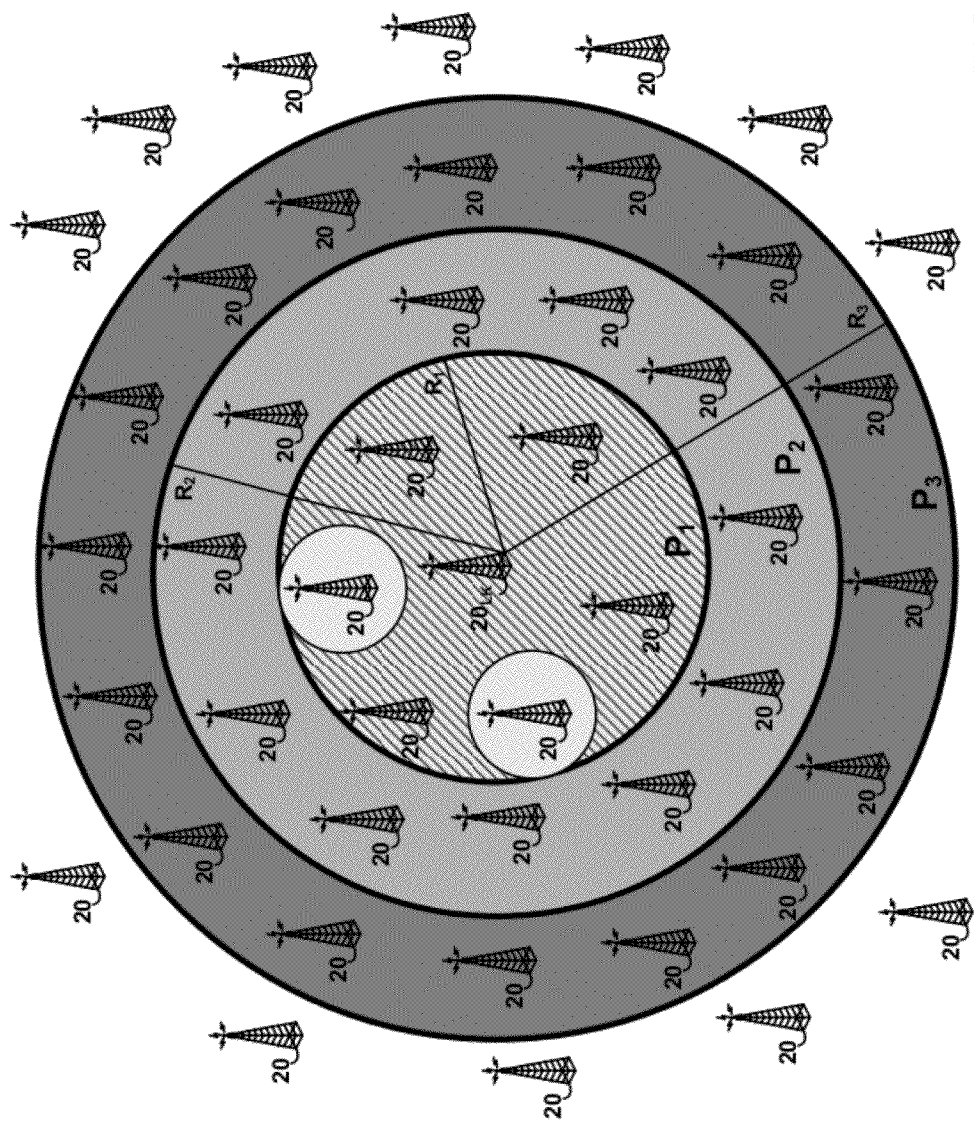
FIG. 7 depicts an adjusted paging area that may result from the method of FIG. 6.

FIG. 7 depicts an adjusted paging area that may result from carrying out the method of FIG. 6. As shown, similar to FIG. 3, the originally-identified paging areas for the mobile station 14, which are depicted with gray shading, may take the form of (a) a first circular paging area $P_1$ defined by a first radius $R_1$ from the last-known BTS's location, (b) a second circular paging area $P_2$ defined by a larger second radius $R_2$ from the last-known BTS's location, and (c) a third circular paging area $P_3$ defined by an even larger third radius $R_3$ from the last-known BTS's location. Each of these paging areas may encompass a plurality of BTSs 20, and thus a plurality of coverage areas. (For purposes of illustration, FIG. 7 assumes that each BTS 20 serves a single coverage area. As described above, however, each BTS 20 may serve multiple coverage areas.)

According to the first method of FIG. 6, the RNC 24 may then adjust the given identified paging area $P_1$ by removing from that paging area any coverage area that has a paging-channel occupancy above the second threshold. Thus, as shown in FIG. 7, the adjusted paging area, which is depicted with a diagonal pattern, may include some—but not all—of the coverage areas in the original given identified paging area $P_1$. Of course, the coverage areas depicted in FIG. 7 as being removed from the given identified paging area are merely exemplary in nature, and it should be understood that any coverage area may be removed from the given identified paging area as long as it has a paging-channel occupancy above the second threshold.

Figure 8:
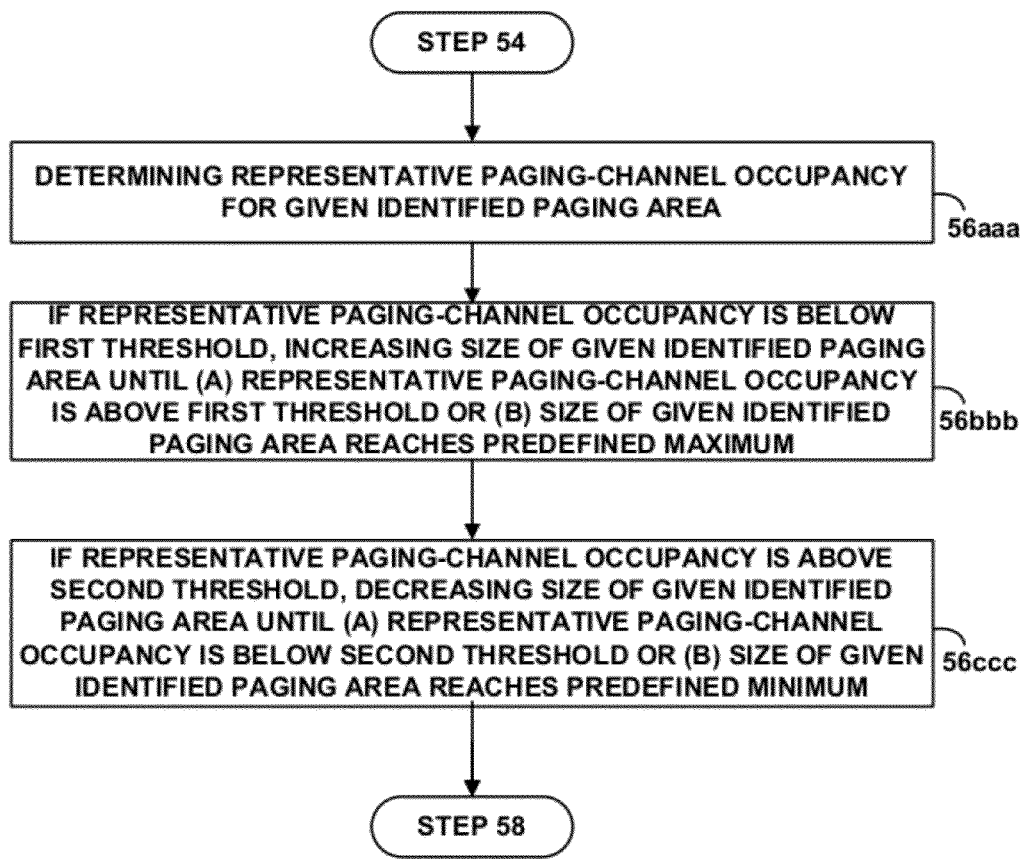
FIG. 8 is a flow chart depicting a third method of adjusting a given identified paging area based on determined paging-channel occupancies.

FIG. 8 is a flow chart depicting a third method of adjusting the given identified paging area based on the determined paging-channel occupancies. At step 56aaa, the RNC 24 may determine a representative paging-channel occupancy for the given identified paging area. In one example, the representative paging-channel occupancy for the given identified paging area will be an average of the paging-channel occupancies of all coverage areas in the given identified paging area. In this respect, the average of the paging-channel occupancies of the coverage areas may be an average of the paging-channel occupancies at a specific point in time or over a period of time (e.g., 30 minutes). In another example, the representative paging-channel occupancy for the given identified paging area may be a total number of messages occupying the paging channels of all coverage areas in the given identified paging area. Other examples are possible as well. In any case, as described above, the RNC 24 may maintain or have access to a paging-channel database that stores data indicating the paging-channel occupancy of each coverage area of the access network 12. As such, to determine the representative paging-channel occupancy for the given identified paging area, the RNC 24 may access data indicating the paging-channel occupancy of the coverage areas in the given identified paging area and then perform any necessary calculations to generate the representative paging-channel occupancy.

At step 56bbb, if the representative paging-channel occupancy for the given identified paging area is below a first threshold, the RNC 24 may increase a size of the given identified paging area until (a) the representative paging-channel occupancy for the now-increased given identified paging area is above the first threshold or (b) the size of the now-increased given identified paging area reaches a predefined maximum. The first threshold may represent a lower limit of an acceptable representative paging-channel occupancy range, such that a given identified paging area having a representative paging-channel occupancy below that threshold can experience an increase in representative paging-channel occupancy without significantly degrading network performance.

The RNC 24 may first compare the representative paging-channel occupancy to the first threshold, to determine whether to begin increasing the size of the given identified paging area. Thereafter, the RNC 24 may increase the size of the given identified paging area in predefined step-sizes. Before increasing the size of the given identified paging area by each predefined step-size, the RNC 24 may first determine whether that increase will result in the given identified paging area's size exceeding the predefined maximum size. If so, the RNC 24 will not increase the size of the given identified paging area by the predefined step-size. Otherwise, the RNC 24 may increase the size of the given identified paging area by the predefined step-size, recalculate the representative paging-channel occupancy for the given identified paging area, and then compare the updated representative paging-channel occupancy to the first threshold.

If the updated representative paging-channel occupancy is still less than the first threshold, the RNC 24 may then continue the process of increasing the given identified paging area's size by predefined step-sizes until the (a) the representative paging-channel occupancy for the given identified paging area is above the first threshold or (b) the size of the given identified paging area reaches a predefined maximum. In any event, increasing the size of the given identified paging area results in an adjusted paging area that may include one or more additional coverage areas that were not part of the original paging area.

At step 56ccc, if the representative paging-channel occupancy for the given identified paging area is above a second threshold, the RNC 24 may decrease a size of the given identified paging area until (a) the representative paging-channel occupancy for the now-decreased given identified paging area is below the second threshold or (b) the size of the now-decreased given identified paging area reaches a predefined minimum. The second threshold may represent an upper limit of an acceptable representative paging-channel occupancy range, such that a given identified paging area having a representative paging-channel occupancy above that threshold should experience a decrease in representative paging-channel occupancy to avoid significantly degrading network performance.

The RNC 24 may first compare the representative paging-channel occupancy to the second threshold, to determine whether to begin decreasing the size of the given identified paging area. Thereafter, the RNC 24 may decrease the size of the given identified paging area in predefined step-sizes.

Before decreasing the size of the given identified paging area by each predefined step-size, the RNC 24 may first determine whether that decrease will result in the given identified paging area's size falling below the predefined minimum size. If so, the RNC 24 will not decrease the size of the given identified paging area by the predefined step-size. Otherwise, the RNC 24 may decrease the size of the given identified paging area by the predefined step-size, recalculate the representative paging-channel occupancy for the given identified paging area, and then compare the updated representative paging-channel occupancy to the second threshold.

If the updated representative paging-channel occupancy is still greater than the second threshold, the RNC 24 may then continue the process of decreasing the given identified paging area's size by predefined step-sizes until the (a) the representative paging-channel occupancy for the given identified paging area is below the second threshold or (b) the size of the given identified paging area reaches a predefined minimum. In any event, decreasing the size of the given identified paging area results in an adjusted paging area that may no longer include one or more coverage areas that were part of the original paging area.

Figure 9:
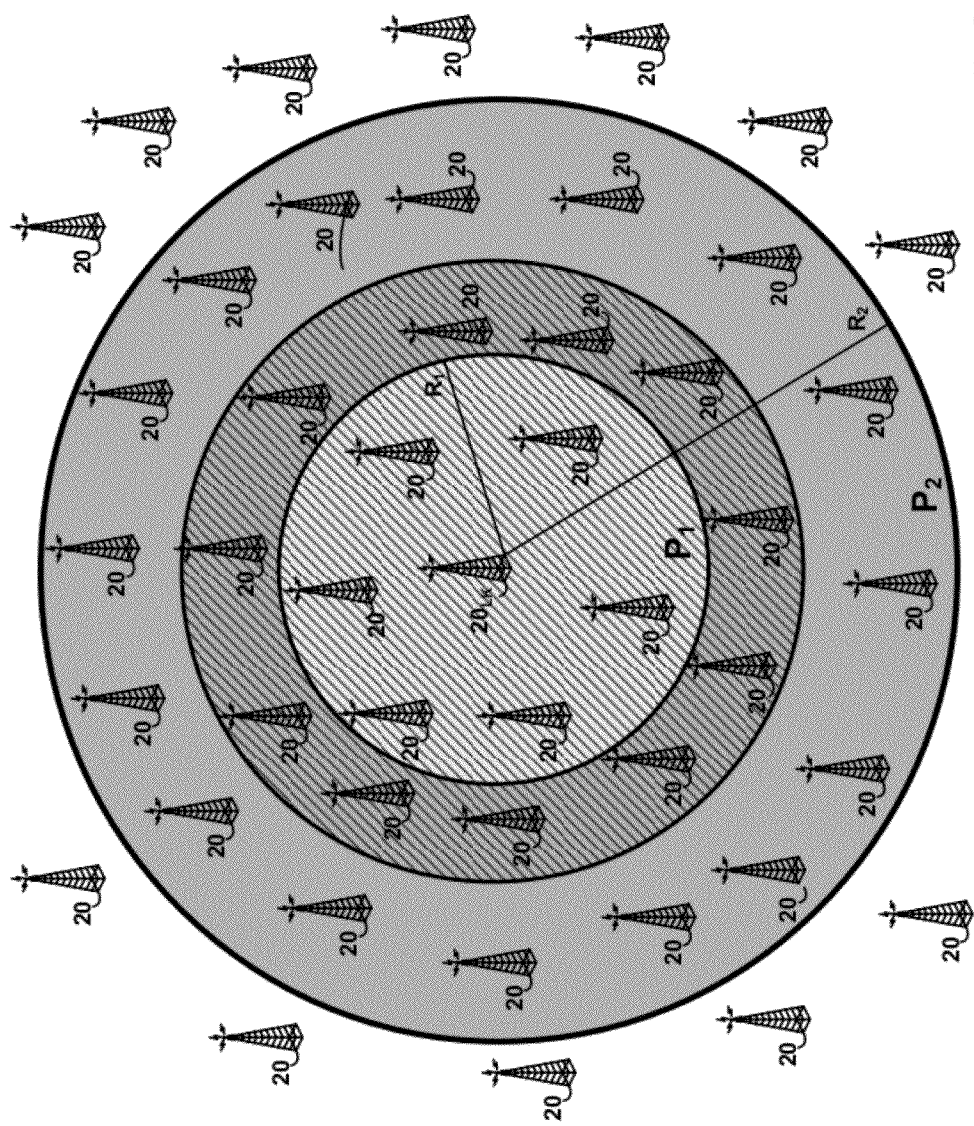
FIG. 9 depicts an adjusted paging area that may result from the method of FIG. 8.

FIG. 9 depicts an adjusted paging area that may result from carrying out the method of FIG. 8. As shown, the originally-identified paging areas for the mobile station 14, which are depicted with gray shading, may take the form of (a) a first circular paging area $P_1$ defined by a first radius $R_1$ from the last-known BTS's location and (b) a second circular paging area $P_2$ defined by a larger second radius $R_2$ from the last-known BTS's location. Each of these paging areas may encompass a plurality of BTSs 20, and thus a plurality of coverage areas. (For purposes of illustration, FIG. 9 assumes that each BTS 20 serves a single coverage area. As described above, however, each BTS 20 may serve multiple coverage areas.)

According to the method of FIG. 8, the RNC 24 may find that the representative paging-channel occupancy is below the first threshold, and responsively increase the size of the given identified paging area $P_1$ in predefined step-sizes until (a) the representative paging-channel occupancy for the now-increased given identified paging area is above the first threshold or (b) the size of the now-increased given identified paging area reaches a predefined maximum. For example, the RNC 24 may increase the defining radius $R_1$ of the circular given identified paging area $P_1$ by predefined step-sizes (e.g., 0.1 miles) until (a) the representative paging-channel occupancy for the given identified paging area is above the first threshold or (b) the radius $R_1$ of the given identified paging area $P_1$ reaches a predefined maximum radius (e.g., 3.5 miles). Thus, as shown in FIG. 9, the adjusted paging area, which is depicted with a diagonal pattern, may take the form of an enlarged paging area that includes the first circular paging area $P_1$ as well as additional coverage areas that were previously outside the original paging area.

Figure 10:
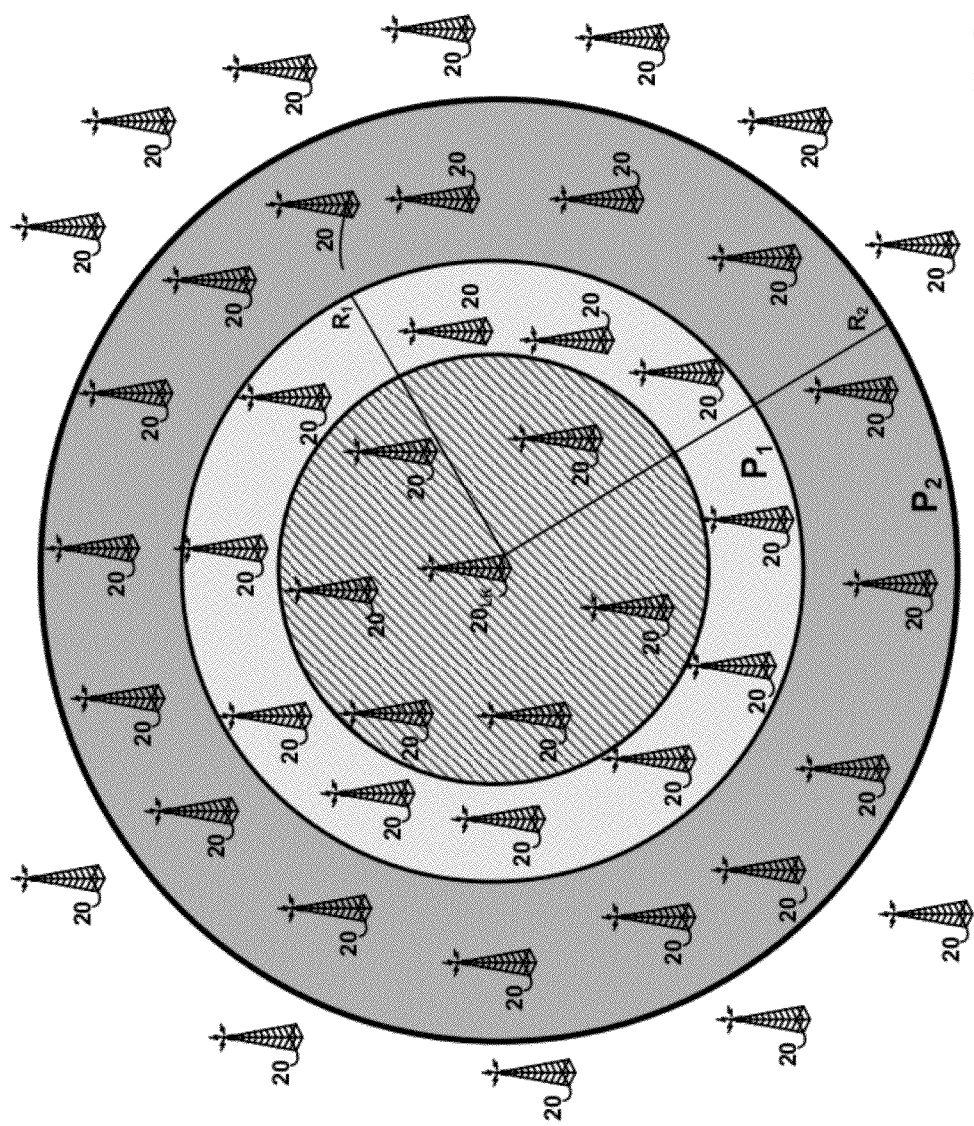
FIG. 10 depicts another adjusted paging area that may result from the method of FIG. 8.

FIG. 10 depicts another adjusted paging area that may result from carrying out the method of FIG. 8. As in FIG. 9, the originally-identified paging areas for the mobile station 14, which are depicted with gray shading, may take the form of (a) a first circular paging area $P_1$ defined by a first radius $R_1$ from the last-known BTS's location and (b) a second circular paging area $P_2$ defined by a larger second radius $R_2$ from the last-known BTS's location. Each of these paging areas may encompass a plurality of BTSs 20, and thus a plurality of coverage areas. (For purposes of illustration, FIG. 10 assumes that each BTS 20 serves a single coverage area. As described above, however, each BTS 20 may serve multiple coverage areas.)

According to the method of FIG. 8, the RNC 24 may find that that the representative paging-channel occupancy is above the second threshold and responsively decrease the size of the given identified paging area $P_1$ in predefined step-sizes until (a) the representative paging-channel occupancy for the now-decreased given identified paging area is below the second threshold or (b) the size of the now-decreased given identified paging area reaches a predefined minimum. For example, the RNC 24 may decrease the defining radius $R_1$ of the circular given identified paging area $P_1$ by predefined step-sizes (e.g., 0.1 miles) until (a) the representative paging-channel occupancy for the given identified paging area is below the second threshold or (b) the radius $R_1$ of the given identified paging area $P_1$ reaches a predefined minimum radius (e.g., 3 miles). Thus, as shown in FIG. 10, the adjusted paging area, which is depicted with a diagonal pattern, may take the form of a contracted paging area that no longer includes certain coverage areas that were previously part of the original paging area.

Although the methods described above for adjusting the given identified paging area (and the adjusted paging areas resulting therefrom) are depicted separately, it should be understood that these methods may also be used in combination to adjust the given identified paging area. For example, the RNC 24 may use the method of FIG. 4 and the method of FIG. 6 in combination to adjust the given identified paging area. Other combinations are possible as well. Further, although the methods described above for adjusting the given identified paging area (and the adjusted paging areas resulting therefrom) depict the first paging area $P_1$ as the given identified paging area being adjusted, it should be understood that a paging area other than the first paging area $P_1$ (e.g., a second paging area $P_2$) may be adjusted using these methods.

After adjusting the given identified paging area based on the determined paging-channel occupancies, the RNC 24 may also store data defining the adjusted paging area. For example, the RNC 24 may store the data defining the adjusted paging area in the paging-areas database described above, which stores the data defining the predefined paging areas for each possible reference location. In this respect, the RNC 24 may overwrite the data defining the original paging area with the data defining the adjusted paging area. Other examples are possible as well.

The RNC 24 may later use the data defining the adjusted paging area when next identifying paging areas for the reference location. In particular, when identifying paging areas for the same reference location in the future (e.g., when paging another mobile station 14 associated with the same reference location), the RNC 24 may identify the adjusted paging area—instead of the original given identified paging area—as one of the paging areas based on the reference location. In one example, if the RNC 24 identifies the adjusted paging area as a paging area based on the reference location, the RNC 24 may then adjust that paging area according to the methods described above. In another example, if the RNC 24 identifies the adjusted paging area as a paging area based on the reference location, the RNC 24 may forego further adjustment of that adjusted paging area. In this respect, the RNC 24 may forego further adjustment of the adjusted paging area if less than a threshold amount of time has passed since last adjusting the paging area.

Referring back to FIG. 2, at step 58, the RNC 24 may then page a mobile station 14 associated with the reference location (e.g., a mobile station having the reference location as its last-known location) in the adjusted paging area. In particular, the RNC 24 may send a page message for receipt by the mobile station 14 via each BTS 20 located in the adjusted paging area. In one embodiment, the mobile station 14 paged at step 58 may be the mobile station 14 for which the RNC 24 received a communication request that initiated the method.

As described above, the given identified paging area being adjusted may be a first paging area, a second paging area, or some other paging area. Regardless of which paging area is adjusted to form the adjusted paging area, the RNC's page of the mobile station 14 in that adjusted paging area may be successful, thus enabling the RNC 24 to locate and subsequently set up a communication with the mobile station 14. Alternatively, however, the RNC's page of the mobile station 14 in the adjusted paging area may be unsuccessful, in which case the RNC 24 may need to page the mobile station 14 in other paging areas. In this respect, the RNC 24 may page the mobile station 14 in another identified paging area according to the same methods described above, albeit with different paging-channel occupancy thresholds and/or predefined minimum/maximum sizes.

According to an embodiment, prior to determining the paging-channel occupancies (step 54) and adjusting the given identified paging area based on the determined paging-channel occupancies (step 56), the RNC 24 may first determine whether a representative first-page success rate for the given identified paging area is below a given threshold, which may represent a lower limit of acceptable first-page success rate. If the first-page success rate is below the given threshold, the RNC 24 may then proceed to steps 54 and 56 as above, in which case the RNC 24 may adjust the given identified paging area before paging the mobile station 14 in an attempt to improve the representative first-page success rate. If the first-page success rate is at or above the given threshold, however, the RNC 24 may skip steps 54 and 56, in which case the RNC 24 may page the first mobile station in the original given identified paging area, without adjusting that paging area.

The representative first-page success rate for the given identified paging area may take a variety of forms. For example, the representative first-page success rate for the given identified paging area may be the first-page success rate of the particular given identified paging area (i.e., the number of successful first pages in the particular given identified paging area divided by the number of first pages sent in the particular given identified paging area), in which case the RNC 24 may maintain or have access to historical data indicating the first-page success rate of each possible given identified paging area of the access network 12. As another example, the representative first-page success rate for the given identified paging area may be an average of the first-page success rates of each coverage area in the given identified paging area, in which case the RNC 24 may maintain or have access to historical data indicating the first-page success rate of each coverage area of the access network 12. Other examples are possible as well. In any case, to determine the representative first-page success rate for the given identified paging area, the RNC 24 may access data indicating the first-page success rate for the given identified paging area and then perform any necessary calculations to generate the representative first-page success rate.

Figure 11:
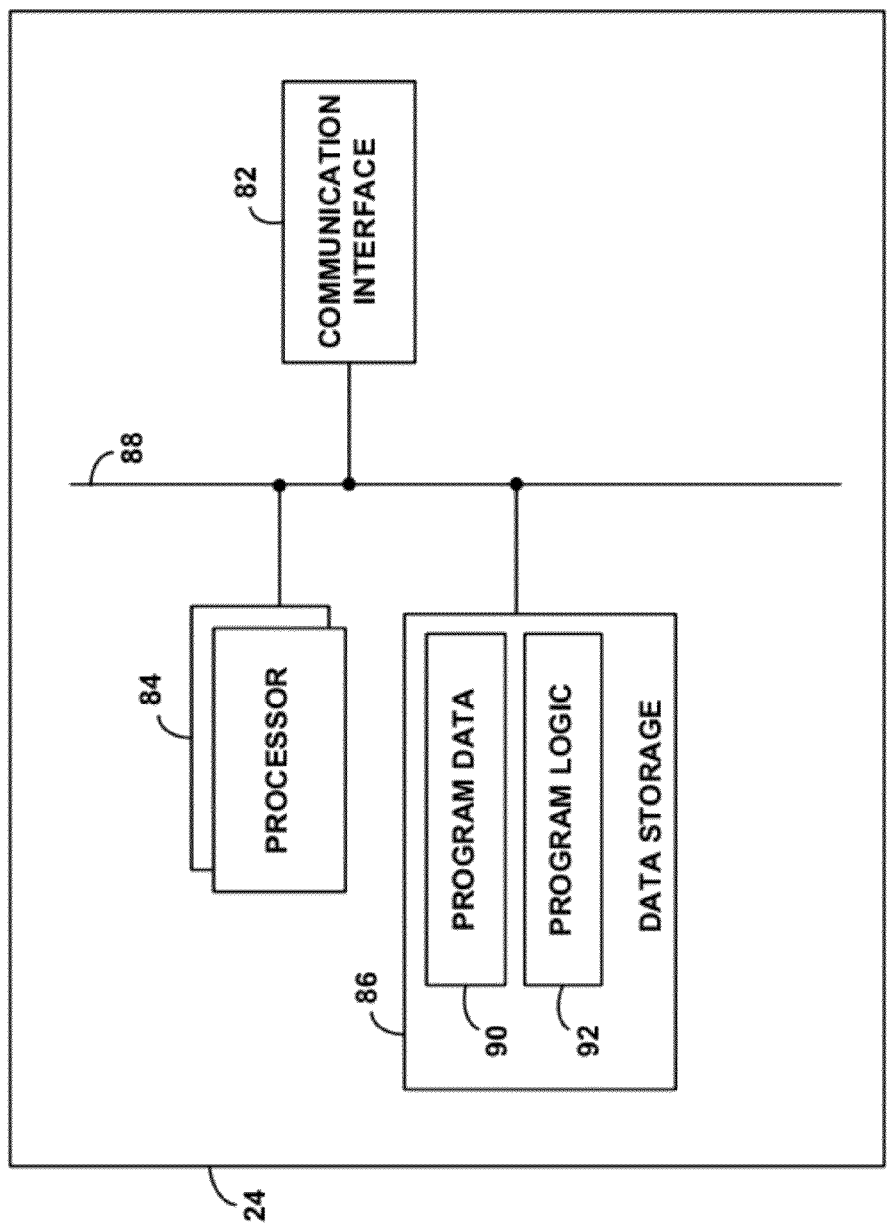
FIG. 11 is a simplified block diagram of an exemplary RNC.

FIG. 11 is a simplified block diagram of an exemplary RNC 24, showing functional components that can operate to carry out aspects of the described embodiments. As shown in FIG. 11, the RNC 24 may include a communication interface 82, a processor 84, and data storage 86, all linked together via a system bus, network, or other connection mechanism 88.

Referring to FIG. 11, the communication interface 82 preferably functions to communicatively couple the RNC 24 to other entities of the system 10, such as the BTSs 20, the circuit-switched network 16 via the switch/gateway 26, and/or the packet-switched network 18 via the switch/gateway 28. As such, the communication interface 82 may take the form of an Ethernet network interface card, a chipset and antenna adapted to facilitate wireless communication according a desired protocol, and/or any other form that provides for wired and/or wireless communication with other entities. The communication interface 82 may also include multiple communication interfaces, such as one communication interface for each entity with which the RNC 24 communicatively couples. Other configurations are also possible.

The processor 84 may comprise one or more general purpose microprocessors and/or one or more dedicated signal processors. (The term "processor" encompasses either a single processor or multiple processors that could work in combination.) Data storage 86, in turn, may comprise memory and/or other storage components, such as optical, magnetic, organic or other memory or disk storage, which can be volatile and/or non-volatile, internal and/or external, and integrated in whole or in part with the processor 84. Data storage 86 preferably contains or is arranged to contain (i) program data 90 and (ii) program logic 92. Although these components are described herein as separate data storage elements, the elements could just as well be physically integrated together or distributed in various other ways. In a preferred example, the program data 90 could be maintained in data storage 86 separate from the program logic 92, for easy updating and reference by the program logic 92.

Program data 90 may contain information about the mobile stations 14 located in the system 10. For example, program data 90 may contain one or more identifiers for each mobile station 14 in the system (e.g., MIN, IMSI, and/or UATI). As another example, program data 90 may contain an indication of a last-known location of each mobile station 14 in the system 10, including each idle mobile station 14. In this respect, the last-known location of the mobile station 14 may be a location of the last-known BTS 20 with which the mobile station 14 was communicating, the last-known geographic location of the mobile station 14, and/or some other location within the last-known coverage area in which the mobile station 14 was located. As yet another example, program data 90 may contain other parameters that the RNC 24 may receive from the mobile stations 14 for defining the paging areas, such as a distance parameter in a location update (e.g., a RouteUpdateRadius in an IS-856 Route Update Message). Program data 90 may contain other data about the mobile stations 14 as well.

Program data 90 may also contain information about the BTSs 20 and corresponding coverage areas in the system 10. For example, program data 90 may contain one or more identifiers for each BTS 20 and its respective coverage area(s) (e.g., BSID, carrier frequency, PN offsets, etc.). As another example, program data 90 may contain an indication of a location of each BTS 20. As yet another example, program data 90 may contain an indication of a centroid or other relevant location within each coverage area. At still another example, program data 90 may contain an indication of paging-channel occupancy for each coverage area of the access network 12. As a further example, program data 90 may contain an indication of first-page success rate for each coverage area of the access network 12. Program data 90 may contain other information about the BTSs 20 and corresponding coverage areas as well.

Program data 90 may further contain information about the predefined paging areas for each possible reference location. For example, program data 90 may contain an indication of a quantity of predefined paging areas for each possible reference location. As another example, program data 90 may contain data defining the predefined paging areas for each possible reference location, such as indications of the shape, size, and/or location of the predefined paging areas. As yet another example, program data 90 may contain one or more identifiers of the BTSs 20 and corresponding coverage areas located in the predefined paging areas for each possible reference location. As still another example, program data 90 may contain an indication of first-page success rate for each possible predefined paging area. Program data 90 may contain other information about the predefined paging areas as well.

Program logic 92 preferably comprises machine-language instructions that may be executed and/or interpreted by processor 84 to carry out functions according to examples described herein, including the functions described with reference to FIGS. 2, 4, 6, and 8. It should be understood, however, that the program logic 92 and its associated functions are described herein by way of example only. As such, those skilled in the art will appreciate that other program logic and/or functions may be used instead, some program logic and/or functions may be added, and some program logic and/or functions may be omitted altogether. Further, the various functions described herein can be embodied in software, hardware, and/or firmware.

For example, the program logic 92 may be executable by the processor 84 to facilitate paging of a mobile station 14, according to the methods described above. In this respect, the program logic 92 may be executable by the processor 84 to (a) identify two or more paging areas based on a reference location, where each paging area comprises at least one coverage area and each coverage area has a paging channel arranged to carry paging messages, (b) determine paging-channel occupancies for coverage areas in at least one of the identified two or more paging areas, (c) adjust the given identified paging area based on the determined paging-channel occupancies, resulting in an adjusted paging area, and (d) page a mobile station 14 associated with the reference location in the adjusted paging area. In one example, the program logic 92 may be executable by the processor 84 to carry out steps (b)-(c) only after first determining that a representative first-page success rate for the given identified paging area is below a given threshold.

In one example, the program logic 92 may be executable by the processor 84 to adjust the given identified paging area by adding to the given identified paging area any coverage area in an identified paging area other than the given identified paging area with a paging-channel occupancy below a first threshold. In another example, the program logic 92 may be executable by the processor 84 to adjust the given identified paging area by removing from the given identified paging area any coverage area in the given identified paging area with a paging-channel occupancy above a second threshold. In still another example, the program logic 92 may be executable by the processor 84 to adjust the given identified paging area by (a) determining a representative paging-channel occupancy for the given identified paging area, (b) if the representative paging-channel occupancy for the given identified paging area is below a first threshold, increasing a size of the given identified paging area until (1) the representative paging-channel occupancy for the now-increased given identified paging area is above the first threshold or (2) the size of the now-increased given identified paging area reaches a predefined maximum, and (c) if the representative paging-channel occupancy for the given identified paging area is above a second threshold, decreasing a size of the given identified paging area until (1) the representative paging-channel occupancy for the now-decreased given identified paging area is below the second threshold or (2) the size of the now-decreased given identified paging area reaches a predefined minimum.

Exemplary embodiments have been described above. Those skilled in the art will understand, however, that changes and modifications may be made to the embodiments described without departing from the true scope and spirit of the following claims.

We claim:

1. A method of paging a mobile station in an access network, wherein the access network serves mobile stations located in a plurality of coverage areas, the method comprising:
   identifying two or more paging areas based on a reference location, wherein each paging area comprises at least one coverage area, and wherein each coverage area has a paging channel arranged to carry paging messages;
   determining paging-channel occupancies for coverage areas in at least one of the identified two or more paging areas;
   adjusting a given identified paging area based on the determined paging-channel occupancies, resulting in an adjusted paging area; and
   paging a mobile station associated with the reference location in the adjusted paging area.

2. The method of claim 1, wherein the reference location comprises a last-known location of the mobile station being paged.

3. The method of claim 2, wherein the last-known location of the mobile station being paged comprises a location of a last-known base transceiver station (BTS) with which the mobile station communicated.

4. The method of claim 2, wherein the two or more identified paging areas comprise:
   a first paging area defined by a first radius from the last-known location of the mobile station;
   a second paging area defined by a second radius from the last-known location of the mobile station, wherein the second radius is greater than the first radius; and
   a third paging area defined by a third radius from the last-known location of the mobile station, wherein the third radius is greater than the second radius.

5. The method of claim 1, wherein adjusting the given identified paging area based on the determined paging-channel occupancies comprises:
   adding to the given identified paging area any coverage area in an identified paging area other than the given identified paging area with a paging-channel occupancy below a first threshold.

6. The method of claim 1, wherein adjusting the given identified paging area based on the determined paging-channel occupancies comprises:
   removing from the given identified paging area any coverage area in the given identified paging area with a paging-channel occupancy above a second threshold.

7. The method of claim 1, wherein the paging channels comprise IS-856 forward control channels.

8. The method of claim 1, wherein the paging channels comprise 1xRTT forward paging channels.

9. The method of claim 1, further comprising:
   storing data defining the adjusted paging area; and
   performing a subsequent identification of two or more paging areas for the reference location, wherein one of the identified two or more paging areas comprises the adjusted paging area.

10. The method of claim 1, wherein the given identified paging area comprises a first paging area in which to send a first page to the mobile station.

11. The method of claim 1, wherein the given identified paging area comprises a second paging area in which to send a second page to the mobile station.

12. The method of claim 1, carried out in response to receiving a request to set up a communication with the mobile station.

13. The method of claim 1, wherein adjusting the given identified paging area based on the determined paging-channel occupancies comprises:

determining that a representative paging-channel occupancy for the given identified paging area is outside of a threshold range of paging-channel occupancies;

in response to determining that the representative paging-channel occupancy is outside of the threshold range, beginning to adjust a size of the given identified paging area;

after beginning to adjust the size of the given identified paging area, determining (a) that the representative paging-channel occupancy for the now-adjusted given identified paging area is within the threshold range or (b) that the size of the now-adjusted given identified paging area has reached a threshold size; and in response to determining (a) or (b), ceasing to adjust the size of the given identified paging area.

14. The method of claim 13, wherein the representative paging-channel occupancy for the given identified paging area comprises an average of the determined paging-channel occupancies for coverage areas in the given identified paging area.

15. A method of paging a mobile station in an access network, wherein the access network serves mobile stations located in a plurality of coverage areas, the method comprising:

identifying two or more paging areas based on a reference location, wherein each paging area comprises at least one coverage area, and wherein each coverage area has a paging channel arranged to carry paging messages;

determining a representative first-page success rate for a given identified paging area;

if the representative first-page success rate for the given identified paging area is greater than or equal to a given threshold, paging a mobile station associated with the reference location in the given identified paging area; and if the representative first-page success rate for the given identified paging area is less than the given threshold:
determining paging-channel occupancies for coverage areas in at least one of the identified two or more paging areas;
adjusting the given identified paging area based on the determined paging-channel occupancies for coverage areas in the at least one identified paging area, resulting in an adjusted paging area; and
paging a mobile station associated with the reference location in the adjusted paging area.

16. The method of claim 15, wherein adjusting the given identified paging area based on the determined paging-channel occupancies comprises:

adding to the given identified paging area any coverage area in an identified paging area other than the given identified paging area with a paging-channel occupancy below a first threshold.

17. The method of claim 15, wherein the representative first-page success rate of the given identified paging area comprises a number of successful first pages in the given identified paging area divided by a number of first pages sent in the given identified paging area.

18. The method of claim 15, wherein the representative first-page success rate of the given identified paging area comprises an average of first-page success rates of coverage areas in the given identified paging area.

19. The method of claim 15, wherein adjusting the given identified paging area based on the determined paging-channel occupancies comprises:

determining that a representative paging-channel occupancy for the given identified paging area is outside of a threshold range of paging-channel occupancies;

in response to determining that the representative paging-channel occupancy is outside of the threshold range, beginning to adjust a size of the given identified paging area;

after beginning to adjust the size of the given identified paging area, determining (a) that the representative paging-channel occupancy for the now-adjusted given identified paging area is within the threshold range or (b) that the size of the now-adjusted given identified paging area has reached a threshold size; and in response to determining (a) or (b), ceasing to adjust the size of the given identified paging area.

20. A radio network controller (RNC) comprising:

a communication interface coupled to a plurality of base transceiver stations (BTSs), wherein each BTS serves mobile stations in a respective coverage area, and wherein the RNC communicates with mobile stations via the communication interface and the BTSs;

a processor;

data storage; and program instructions stored in the data storage and executable by the processor for:
identifying two or more paging areas based on a reference location, wherein each paging area comprises at least one coverage area, and wherein each coverage area has a paging channel arranged to carry paging messages;
determining paging-channel occupancies for coverage areas in at least one of the identified two or more paging areas;
adjusting a given identified paging area based on the determined paging-channel occupancies for coverage areas in the at least one identified paging area, resulting in an adjusted paging area; and
paging a mobile station associated with the reference location in the adjusted paging area.

* * * * *